Feb. 13, 1962 W. L. LINDNER ETAL 3,021,179
WHEEL TRACTION DEVICE
Filed Feb. 24, 1961 2 Sheets-Sheet 1
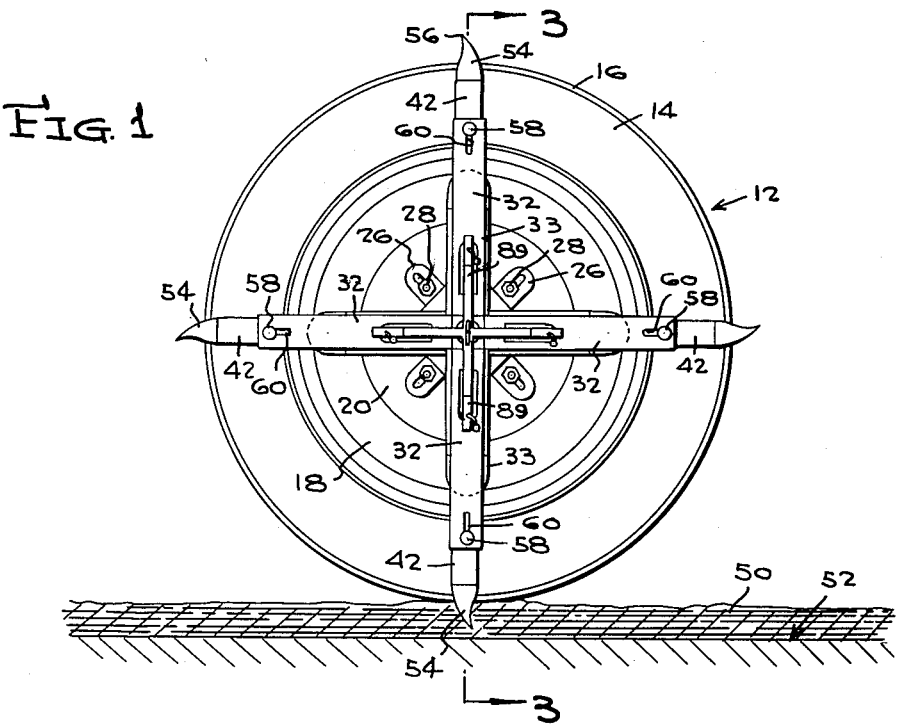
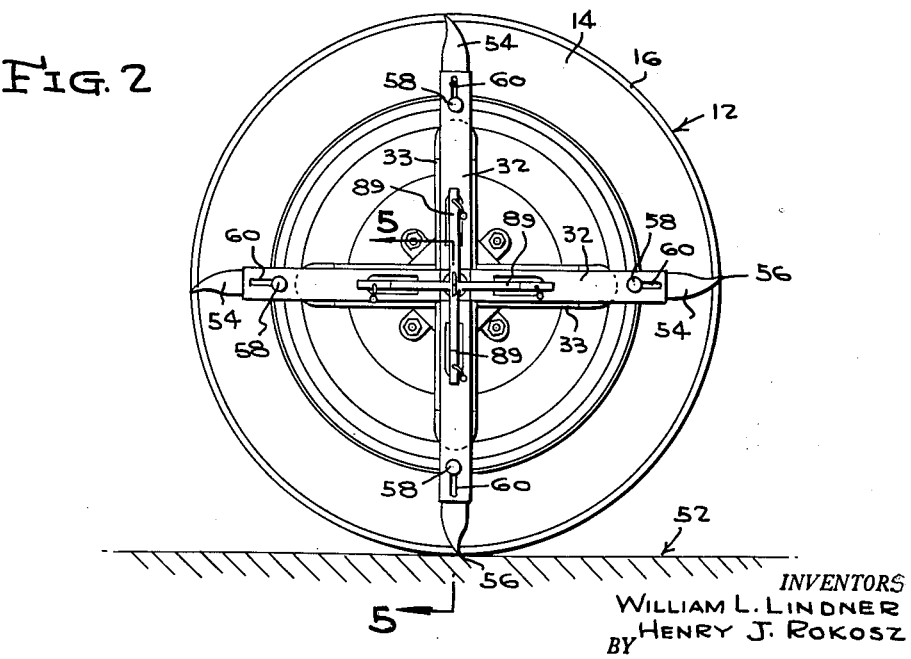
INVENTORS
WILLIAM L. LINDNER
HENRY J. ROKOSZ
BY
McMorrow, Berman + Davidson
ATTORNEYS

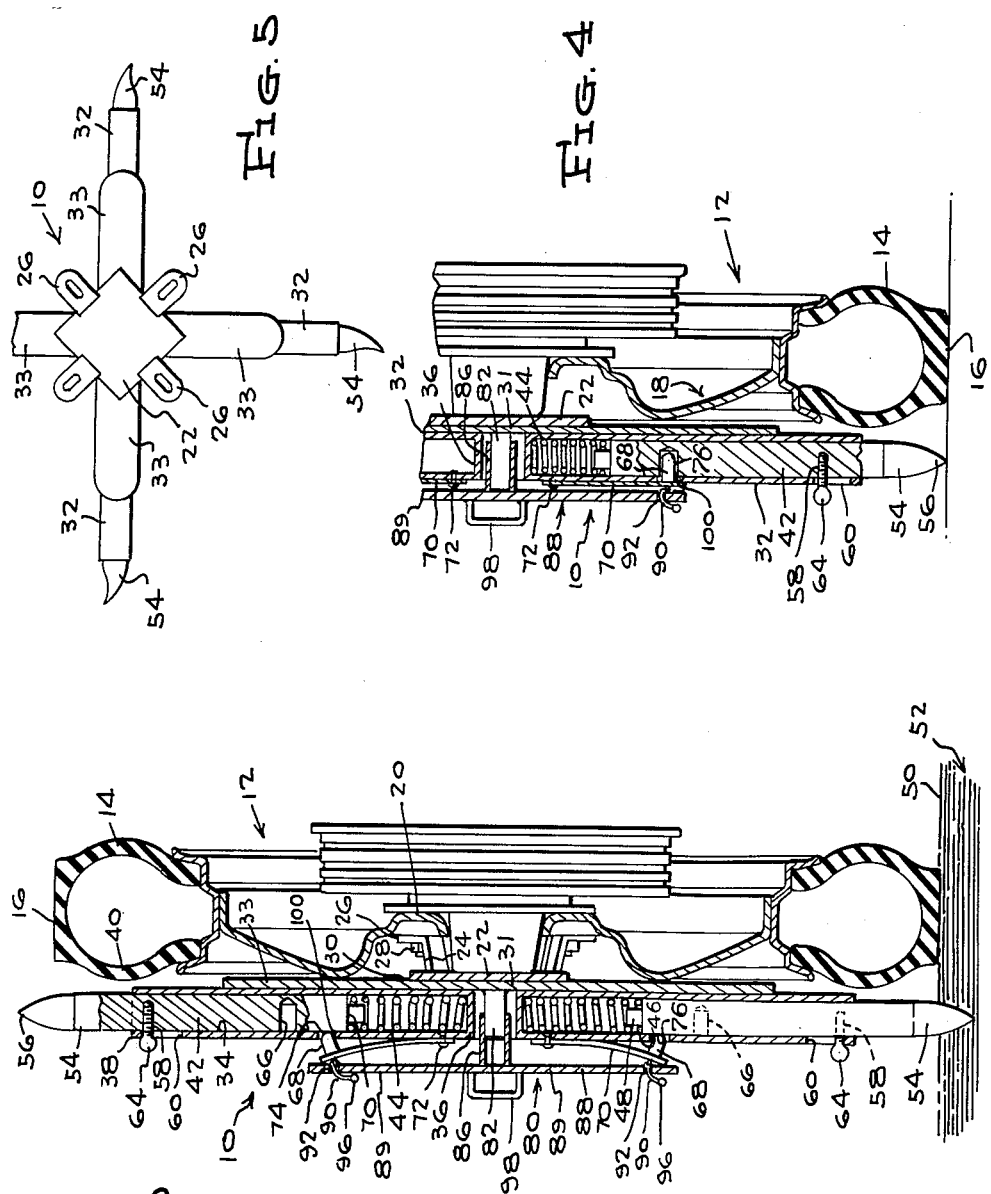

3,021,179
Patented Feb. 13, 1962

3,021,179
WHEEL TRACTION DEVICE
William L. Lindner, 1755 E. 224th St., Sauk Village, Ill., and Henry J. Rokosz, 5534 S. Loomis Blvd., Chicago, Ill.
Filed Feb. 24, 1961, Ser. No. 91,426
5 Claims. (Cl. 301—47)

This invention relates to improvements in traction devices for tire-equipped vehicle wheels, and more particularly to a novel and improved device of this kind which is adapted to be mounted on the outboard side of a wheel disc and has radial spring-urged traction members adapted to reach outwardly beyond the tread of the tire on the wheel, and the outboard side of the tire, and dig into compacted snow or ice, as the wheel is rotated in contact with the ground.

The primary object of the invention is the provision of a more practical, efficient, and easily used device of the kind indicated, wherein the traction members, in their intended spring-urged positions, are out-pressed with sufficient force to dig effectively into compacted snow and ice, and to provide efficient traction for vehicle wheels on compacted snow and ice, but which, when encountering hard road surface, yield inwardly, in a manner to prevent damage to the traction members and a hard road surface.

Another object of the invention is the provision of a device of the character indicated above, wherein manual means is provided for locking the traction elements, in elevated positions, wherein the traction members are out of contact with a road surface, and for releasing the traction members to extended positions, said manual means being in the form of a single centered handle-equipped member.

Other important objects and advantageous features of the invention will be apparent from the following description and the accompanying drawings, wherein, for purposes of illustration only, a specific form of the invention is set forth in detail.

In the drawings:

FIGURE 1 is an outboard side elevation of a tire-equipped vehicle wheel, equipped with a traction device of the present invention, whose traction members are shown in extended positions and biting into compacted snow or ice on a road surface;

FIGURE 2 is a view like FIGURE 1, showing the traction members in elevated positions, out of contact with a road surface;

FIGURE 3 is an enlarged vertical transverse section taken on the line 3—3 of FIGURE 1;

FIGURE 4 is a fragmentary view like FIGURE 3, showing the traction elements in retracted positions; and FIGURE 5 is a fragmentary inboard side elevation of said device, per se.

Referring in detail to the drawings, wherein like numerals designate like parts throughout the several views, the illustrated traction device, generally designated 10, is shown installed on a vehicle wheel 12, having a pneumatic tire 14 thereon having a tread 16, and a wheel disc 18. The wheel disc 18 has a central annular portion 20.

The traction device 10 comprises a flat central web 22, preferably smaller in diameter than the wheel disc portion 20, and here shown as being square, and which has fixed thereto, at equally circumferentially spaced points, outwardly extending brackets 24, which are fixed to the wheel disc portion 20, as by means of bolts 28, extending therethrough, in a manner to center the web 22 relative to the wheel disc 18, at the outboard side thereof.

Suitably fixed to the outboard surface of the web 22, as by weldings 30, is the central portion 31 of a spider having two diametrically opposed pairs of equally circumferentially spaced flat arms 33, on whose outboard surfaces are affixed, as indicated at 35, elongated tubes 32, having polygonal bores 34, preferably square, extending therethrough. The tubes 32 have closed inner ends 36, which are radially spaced from each other, and open outer ends 38, and the tubes 32 are so positioned and are of such lengths that their outer ends 38 are located close to the outboard sidewalls 40 of the tire 14, and spaced radially inwardly from the tread 16 of the tire.

Slidably and non-rotatably engaged in the outer ends of the tubes 32 are preferably solid, rigid traction bars 42, of the same cross section as the tube bores 34, the bars 42 being, in the illustrated form of the invention, of substantially the same length as the tubes 32. Strong coil springs 44 are disposed in the tubes 32 and are compressed between the closed inner ends 36 of the tubes and the squared inner ends 46 of the traction bars 42, and the outer ends of the springs are circumposed on axial bosses 48 on the inner ends of the bars. The springs 44 are long enough and strong enough to extend the traction bars 42 far enough beyond the tire tread 16 and with sufficient force, to effectively dig into compacted snow or ice 50, present upon a road surface 52. The traction bars 42 are formed, on their outer ends, with pyramidical points 54, whose tips 56 are angled, out of the longitudinal axes of the bars, in the direction of drive rotation of the vehicle wheel 12 for a better traction grip in snow or ice.

Endwise movements of the traction bars 42, are limited by means of stop pins 58 engaged in longitudinal slots 60, provided in the outboard walls 62 of the tubes 32. The pins 58 are preferably threaded in the outboard sides of the bars 42, and have enlarged heads 64, on their outboard ends, which extend outwardly beyond the outboard walls 62, and provide means by which the bars 42 can be retracted, against the resistance of the springs 44, to retracted positions, as shown in FIGURE 4.

At locations nearer to their inner ends than to their outer ends, the tractions bars 42 are provided, on their outboard sides, with detent sockets 66, to be engaged by detent pins 68, only in the retracted positions of the bars 42. The detent locking pins 68 are fixed to and extend inboardly from the outer ends of radially elongated leaf springs 70 which are fixed at their inner ends, as indicated at 72, to the outboard walls 62 of the tubes 32, at locations close to the inner ends of the tubes. The leaf springs 70 extend longitudinally outwardly along the tubes 32 and are, as shown in FIGURE 3, bowed away from the outboard walls 62 of the tubes, so as to position the rounded noses 74 of the detent pins 68 in holes 76 provided in the outboard walls 62, located intermediate the ends of the tubes 32.

For operating the detent pins 68 through the holes 76, and into and out of the detent or locking sockets 66 of the traction bars 42, when the traction bars are in their retracted positions, a manual operator and retainer, generally designated 80 is provided.

The operator and retainer 80 comprises a stub shaft 82, fixed to and projecting outboardly from the central portion 31 of the spider, and equally radially spaced from the closed inner ends 36 of the tubes 32, on which a tubular hub 86 is slidably and frictionally engaged. The hub 86 is fixed, at its outboard end, to the center of a flat cruciform 88, which is slightly larger in diameter than the distances between diametrically opposed locking pins 68, and is positioned at the outboard sides of the leaf springs 70. The cruciform has radial arms 89 along which the leaf springs 70 extend. The leaf springs 70 are loosely and flexibly connected, at their radially outward ends, to the outer ends of the arms 89 by lost-motion means such as metal or other suitable material cords 90 extending through holes 92, formed on the arms 89, near their outer ends. The cords 90 are suitably fixed, at their inboard ends, to the outer ends of the springs 70, and have enlarged retaining heads 96, on their outboard ends. Sufficient slack is provided in the cords 90, so that, in either the outboardly withdrawn position of the cruciform 88, as shown in FIGURE 3, or the inboard position of the disc 18, shown in FIGURE 4, the cords 90 produce no restrictive connections between the cruciform 88 and the springs 70. A bail handle 98 is centered on the outboard side of the cruciform 88.

In operation, the cruciform 88 being in its outboard position, the locking pins 68 being out of engagement with the locking sockets 66, and the traction bars 42 being in their extended positions, the points 54 of the bars 42 extend beyond the tire tread 16 and bite into snow or ice 50 present on a road surface 52 upon which the vehicle wheel 12 is being driven. However, whenever the vehicle moves off the ice or snow 50 onto the hard and unyielding road surface 52, the springs 44 yield so that the traction bars 42 are forced into their tubes 32 and the points 54 of the bars 42 engage the road surface 52 harmlessly, as the wheel 12 rotates, but are constantly ready to be extended to bite into a yielding surface, such as the snow and ice 50, when encountered.

Whenever it is desired to retract the traction bars 42, so as to render the device inoperative, the bars 42 are pushed inwardly, one by one, until their locking sockets 66 are registered with the tube holes 76, and the locking pins 68 pushed through the holes 76 into the sockets 66. The cruciform 88 is then pushed inboardly, on the stub shaft 82, until the arms 89 bear retainably against the leaf springs 70, as shown in FIGURE 4. In case the inboard ends of the cords 90 are secured to eyes 100 projecting outboardly from the leaf springs 70, as shown, the retaining engagement of the arms 89 is against the eyes 100, rather than directly against the leaf springs 70. There is sufficient frictional engagement between the hub 86 and the stub shaft 82 to resist any tendency of the leaf springs to displace the cruciform 88 from its inboard retaining position.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a vehicle wheel having a pneumatic tire thereon having a tread and a wheel disc having an annular central portion, a traction device comprising a spider having a central portion, mounting means removably securing the same to the outboard side of the central portion of the wheel disc, said spider having spaced radial arms, tubes fixed to and extending along said arms, said tubes having closed inner ends and open outer ends, traction bars slidably and non-rotatably engaged in the outer ends of the tubes, said traction bars having traction points on their outer ends, said traction bars having inner ends, spring means urging said traction bars out of the outer ends of the tubes, means limiting outward and inward movements of the traction bars in said tubes, the traction bar points normally reaching beyond the tread of the tire for digging into penetrable ice or snow on a hard road surface, said spring means being yieldable to enable inward displacement of the traction bar points on contact thereof with a hard road surface devoid of penetrable snow or ice, and means for releasably locking the traction bars in retracted positions in said tubes wherein the traction bar points are located inwardly of the tire tread, said means comprising holes in the sidewalls of the tubes located intermediate the ends of the tubes, locking sockets in the traction bars, and locking pins movably mounted on the tubes and engageable through the tube holes into the locking sockets, radially elongated leaf springs extending along the tubes and having inner ends fixed to the tubes and outer ends spaced away from the tubes, said locking pins being fixed on the outer ends of the leaf springs, and operating and retaining means comprising an axial stub shaft fixed on and extending outboardly from the central portion of the spider, an operating plate having a central tubular hub extending inboardly therefrom and slidably and frictionally engaged on said stub shaft, said plate being positioned at the outboard sides of the leaf springs and being movable in an inboard direction in said stub shaft to engage and push the locking pins into and retain the pins in the traction bar locking sockets.

2. In combination, a vehicle wheel having a pneumatic tire thereon having a tread and a wheel disc having an annular central portion, a traction device comprising a spider having a central portion, mounting means removably securing the same to the outboard side of the central portion of the wheel disc, said spider having spaced radial arms, tubes fixed to and extending along said arms, said tubes having closed inner ends and open outer ends, traction bars slidably and non-rotatably engaged in the outer ends of the tubes, said traction bars having traction points on their outer ends, said traction bars having inner ends, spring means urging said traction bars out of the outer ends of the tubes, means limiting outward and inward movements of the traction bars in said tubes, the traction bar points normally reaching beyond the tread of the tire for digging into penetrable ice or snow on a hard road surface, said spring means being yieldable to enable inward displacement of the traction bar points on contact thereof with a hard road surface devoid of penetrable snow or ice, and means for releasably locking the traction bars in retracted positions in said tubes wherein the traction bar points are located inwardly of the tire tread, said means comprising holes in the sidewalls of the tubes located intermediate the ends of the tubes, locking sockets in the traction bars, and locking pins movably mounted on the tubes and engageable through the tube holes into the locking sockets, radially elongated leaf springs extending along the tubes and having inner ends fixed to the tubes and outer ends spaced away from the tubes, said locking pins being fixed on the outer ends of the leaf springs, and operating and retaining means comprising an axial stub shaft fixed on and extending outboardly from the central portion of the spider, an operating plate having a central tubular hub extending inboardly therefrom and slidably and frictionally engaged on said stub shaft, said plate being positioned at the outboard sides of the leaf springs and being movable in an inboard direction on said stub shaft to engage and push the locking pins into and retain the pins in the traction bar locking sockets, and flexible lost-motion means extending between and connected to the outer ends of the leaf springs and said operating plate.

3. In combination, a vehicle wheel having a pneumatic tire thereon having a tread and a wheel disc having an annular central portion, a traction device comprising a spider having a central portion, mounting means removably securing the same to the outboard side of the central portion of the wheel disc, said spider having spaced radial arms, tubes fixed to and extending along said arms, said tubes having closed inner ends and open outer ends, traction bars slidably and non-rotatably engaged in the outer ends of the tubes, said traction bars having traction points on their outer ends, said traction bars having inner ends, spring means urging said traction bars out of the outer ends of the tubes, means limiting outward and inward movements of the traction bars in said tubes, the traction bar points normally reaching beyond the tread of the tire for digging into penetrable ice or snow on a hard road surface, said spring means being yieldable to enable inward displacement of the traction bar points on contact thereof with a hard road surface devoid of penetrable snow or ice, and means for releasably locking the tractions bars in retracted positions in said tubes wherein the traction bar points are located inwardly of the tire tread, said means comprising holes in the sidewalls of the tubes located intermediate the ends of the tubes, locking sockets in the traction bars, and locking pins movably mounted on the tubes and engageable through the tube holes into the locking sockets, radially elongated leaf springs extending along the tubes and having inner ends fixed to the tubes and outer ends spaced away from the tubes, said locking pins being fixed on the outer ends of the leaf springs, and operating and retaining means comprising an axial stub shaft fixed on and extending outboardly from the central portion of the spider, an operating plate having a central tubular hub extending inboardly therefrom and slidably and frictionally engaged on said stub shaft, said plate being positioned at the outboard sides of the leaf springs and being movable in an inboard direction on said stub shaft to engage and push the locking pins into and retain the pins in the traction bar locking sockets, said operating plate being cruciform and having a central portion and radial arms extending along the leaf springs, and a bail handle fixed to and extending outboardly from the central portion of the cruciform.

4. In combination, a vehicle wheel having a pneumatic tire thereon having a tread and a wheel disc having an annular central portion, a traction device comprising a spider having a central portion, mounting means removably securing the same to the outboard side of the central portion of the wheel disc, said spider having spaced radial arms, tubes fixed to and extending along said arms, said tubes having closed inner ends and open outer ends, traction bars slidably and non-rotatably engaged in the outer ends of the tubes, said traction bars having traction points on their outer ends, said traction bars having inner ends, spring means urging said traction bars out of the outer ends of the tubes, means limiting outward and inward movements of the traction bars in said tubes, the traction bar points normally reaching beyond the tread of the tire for digging into penetrable ice or snow on a hard road surface, said spring means being yieldable to enable inward displacement of the traction bar points on contact thereof with a hard road surface devoid of penetrable snow or ice, and means for releasably locking the traction bars in retracted positions in said tubes wherein the traction bar points are located inwardly of the tire tread, said means comprising holes in the sidewalls of the tubes located intermediate the ends of the tubes, locking sockets in the traction bars, and locking pins movably mounted on the tubes and engageable through the tube holes into the locking sockets, radially elongated leaf springs extending along the tubes and having inner ends fixed to the tubes and outer ends spaced away from the tubes, said locking pins being fixed on the outer ends of the leaf springs, and operating and retaining means comprising an axial stub shaft fixed on and extending outboardly from the central portion of the spider, an operating plate having a central tubular hub extending inboardly therefrom and slidably and frictionally engaged on said stub shaft, said plate being positioned at the outboard sides of the leaf springs and being movable in an inboard direction on said stub shaft to engage and push the locking pins into and retain the pins in the traction bar locking sockets, said operating plate being cruciform and having a central portion and radial arms extending along the leaf springs, and a bail handle fixed to and extending outboardly from the central portion of the cruciform, and flexible lost-motion means extending between and connected to the outer ends of the leaf springs and the cruciform arms.

5. In combination, a vehicle wheel having a pneumatic tire thereon having a tread and a wheel disc having an annular central portion, a traction device comprising a spider having a central portion, mounting means removably securing the same to the outboard side of the central portion of the wheel disc, said spider having spaced radial arms, tubes fixed to and extending along said arms, said tubes having closed inner ends and open outer ends, traction bars slidably and non-rotatably engaged in the outer ends of the tubes, said traction bars having traction points on their outer ends, said traction bars having inner ends, spring means urging said traction bars out of the outer ends of the tubes, means limiting outward and inward movements of the traction bars in said tubes, the traction bar points normally reaching beyond the tread of the tire for digging into penetrable ice or snow on a hard road surface, said spring means being yieldable to enable inward displacement of the traction bar points on contact thereof with a hard road surface devoid of penetrable snow or ice, and means or releasbly locking the traction bars in retracted positions in said tubes wherein the traction bar points are located inwardly of the tire tread, said means comprising holes in the sidewalls of the tubes located intermediate the ends of the tubes, locking sockets in the traction bars, and locking pins movably mounted on the tubes and engageable through the tube holes into the locking sockets, radially elongated leaf springs extending along the tubes and having inner ends fixed to the tubes and outer ends spaced away from the tubes, said locking pins being fixed on the outer ends of the leaf springs, and operating and retaining means comprising an axial stub shaft fixed on and extending outboardly from the central portion of the spider, an operating plate having a central tubular hub extending inboardly therefrom and slidably and frictionally engaged on said stub shaft, said plate being positioned at the outboard sides of the leaf springs and being movable in an inboard direction on said stub shaft to engage and push the locking pins into and retain the pins in the traction bar locking sockets, said operating plate being cruciform and having a central portion and radial arms extending along the leaf springs, and a bail handle fixed to and extending outboardly from the central portion of the cruciform, and flexible lost motion means extending between and connected to the outer ends of the leaf springs and the cruciform arms comprising holes in the cruciform arms, cords extending through the holes, the cords having inboard ends fixed to the leaf springs and outboard ends, and enlarged heads on the outboard ends of the cords larger in diameter than the holes and engaged with the outboard sides of the cruciform arms.

References Cited in the file of this patent

UNITED STATES PATENTS

| | | |
|---|---|---|
| 1,336,149 | Nelson et al. | Apr. 6, 1920 |
| 1,549,004 | Kading | Aug. 11, 1925 |
| 1,779,909 | Haagen | Oct. 28, 1930 |
| 1,912,714 | Lambert | June 6, 1933 |
| 2,174,944 | Leggett | Oct. 3, 1939 |

FOREIGN PATENTS

| | | |
|---|---|---|
| 28,065 | Austria | Apr. 10, 1907 |